United States Patent [19]

Van Hijfte et al.

[11] 4,123,570
[45] Oct. 31, 1978

[54] PREPARATION OF UREAFORM

[75] Inventors: Willy H. P. Van Hijfte, Assenede;
Luc A. Vanmarcke, Lembeke; Anton Niks, Rixensart, all of Belgium

[73] Assignee: Compagnie Neerlandaise de l'Azote (Societe Anonyme), Brussels, Belgium

[21] Appl. No.: 811,434

[22] Filed: Jun. 29, 1977

[30] Foreign Application Priority Data

Jul. 2, 1976 [GB] United Kingdom ............. 27759/76

[51] Int. Cl.$^2$ .......................... C05C 1/02; C05C 7/00; C05C 9/02
[52] U.S. Cl. ........................................ 427/222; 71/27; 71/28; 71/64 DB; 427/213; 252/384
[58] Field of Search ...................... 71/27, 28, 64 DB; 427/213, 222; 252/384

[56] References Cited

U.S. PATENT DOCUMENTS

| | | | |
|---|---|---|---|
| 2,845,401 | 7/1958 | Gilliam | 71/28 X |
| 3,477,842 | 11/1969 | Cook et al. | 71/28 |
| 3,635,690 | 1/1972 | Griffith | 71/27 X |
| 3,649,598 | 3/1972 | Namioka et al. | 71/28 X |

FOREIGN PATENT DOCUMENTS

691,577 7/1964 Canada ........................................ 71/28

OTHER PUBLICATIONS

*Urea–Formaldehyde Reactions in the Fertilizer Industry,* O'Donnell, James M. et al., Nitroform Agricultural Chemicals, 1957.

*Primary Examiner*—Michael R. Lusignan

[57] ABSTRACT

Preparation of ureaform granules. A concentrated aqueous solution of a urea-formaldehyde condensate is mixed with a catalyst which at normal temperature effects virtually no acid condensation, but a elevated temperature releases sufficient strong acid to effect the acid condensation in a few seconds. The mixture of solution and catalyst is sprayed over solid ureaform particles maintained in spaced interrelationship and at such a temperature that the catalyst is decomposed and effects acid condensation, whereby the sprayed particles are coated with a layer of ureaform and dried.

8 Claims, No Drawings

PREPARATION OF UREAFORM

The present invention relates to the preparation of ureaform.

Ureaform is the generally accepted generic name for a group of fertilizers on the basis of solid urea-formaldehyde condensates which gradually give off their nitrogen to growing plants. The Association of American Fertilizer Control Officials defines ureaform as follows: "Ureaform fertilizer materials are reaction products of urea and formaldehyde containing at least 35% nitrogen, largely in insoluble but slowly available form. The water-insoluble nitrogen shall be at least 60% of the total nitrogen. The water-insoluble nitrogen in these products shall have an activity of not less than 40% when determined by the appropriate AOAC Method".

Ureaform is an odourless, white solid essentially consisting of a mixture of methyleneurea polymers in a range of molecular weights, and hence having a range of solubilities in aqueous solutions, and also containing a minor proportion of unreacted urea.

The reactions which in all probability occur in the preparation of ureaform are represented by the following equations:

(1) $U + CH_2O \rightleftharpoons U.CH_2.OH$ (2) $U.CH_2.OH + CH_2O \rightleftharpoons HO.CH_2.U.CH_2.OH$ (3) $U + U.CH_2.OH \xrightarrow{acid} U.H_2.U + H_2O$ (4) $U.CH_2.U + U.CH_2.OH \rightarrow U.CH_2.U.CH_2.U + H_2O$ (5) $U + HO.CH_2.U.CH_2.OH + U \rightarrow U.CH_2.U.CH_2.U + H_2O$ (6) $U.CH_2.U.CH_2.U + U.CH_2.OH \rightarrow U.CH_2.U.CH_2.U.CH_2.U + H_2O$ First, according to reaction (1), by condensation of formaldehyde and urea in neutral or alkaline medium, monomethylol urea is formed, as well as, by further condensation according to reaction (2), also in neutral or alkaline medium, dimethylol urea. The addition of an acid catalyst causes monomethylol urea to be condensed with urea, according to reaction (3), to form methylene diurea, which product, according to reaction (4), is condensed further with monomethylol urea to form dimethylene triurea. The same product is formed, according to reaction (5), by condensation of dimethylol urea with urea. The product of reaction (4) and (5) can be condensed further with monomethylol urea, according to reaction (6), to form trimethylene tetraurea. So long as the condensation reactions are not stopped by increasing the pH, products having longer chains can of course be formed.

Ureaform can be prepared on a commercial scale in dilute solution or in concentrated solution.

In the preparation in dilute solution, first a dilute liquid condensate of urea and formaldehyde is prepared in neutral of alkaline medium, in which the urea/formaldehyde (U/F) molar ratio generally ranges between 1.3 and 4.0. To this condensate an acid is added to a pH of, for example, 2 to 3. The ureaform formed by acid condensation is precipitated as a fine powder, and is filtered off, whereafter the acid present in the product is neutralized, and the neutralized product is processed into granules and dried. The mother-liquor, which contains non-reacted urea, methylol urea compounds and water-soluble short-chain methylene urea compounds, is recycled for further reaction.

One advantage of the preparation in dilute solution is that the process can be controlled, so that a product of uniform quality is produced. However, the process is very cumbersome: the fine ureaform powder must be filtered off, neutralized, for example, with ammonia, and granulated, whereafter the resulting granules must be subjected to an additional drying treatment.

In the preparation in concentrated solution, an acid is added to a concentrated liquid condensate, the condensate being generally produced by adding solid urea to an aqueous formaldehyde solution and rendering the mixture weakly alkaline and heating to accelerate the formation of methylol urea compounds, and the rapidly reacting mass is spread over a hot surface, for example, a heated, advancing steel belt. At the end of the belt the product is scraped off, cooled, broken into small pieces, and neutralized, for example, with gaseous ammonia.

This process is simpler than the preparation in dilute solution, it is true, but still rather cumbersome. Moreover, the shape and uniformity of the resulting pieces leave much to be desired. An additional important drawback is that the condensation reaction is poorly controllable, as a consequence of which the product produced by this process normally exhibits rather great variations in activity index and in the proportion of cold-water-insoluble nitrogen.

The present invention relates to the preparation of ureaform in concentrated solution, in which the acid condensation, the neutralization, the processing into granules, and the drying are effected in one step.

According to the present invention a concentrated aqueous ureaformaldehyde condensate solution is mixed with a catalyst comprising a salt of a strong inorganic or organic acid and a weak, volatile or non-stable base, which salt at normal temperature effects no or virtually no acid condensation, but at elevated temperature releases so much strong acid as to effect the acid condensation in at most a few seconds, and the mixture of solution and catalyst is sprayed over solid ureaform particles which are kept in spaced inter-relationship and at such an elevated temperature that the catalyst is decomposed and the acid condensation effected, whereby practically simultaneously, or at any rate in very rapid succession, the acid condensation occurs and the sprayed particles are coated with a layer of ureaform and dried, while the acid formed disappears and the pH of the particles becomes approximately 7. The concentrated aqueous urea-formaldehyde condensate solution preferably has a U/F molar ratio of 1.3 to 2.0 and a water content of 15–25% by weight. This solution must admit of ready storage, pumping and spraying, and to that effect preferably has a good stability and a low viscosity. A clear concentrated condensate solution having a low viscosity of approximately 30–35 centipoises at 20° C. and a good stability (no rise in viscosity after one week at 25° C.) is prepared, according to a preferred embodiment of this invention, by adding urea, either as a solid or as an aqueous solution, to an aqueous solution containing free formaldehyde and low-molecular-weight urea-formaldehyde addition products such as methylol urea compounds, and reacting the mixture at a constant pH of 8.0 – 8.5 and a temperature of 50°–70° C., preferably of 55°–65° C., for 50–70 minutes, preferably for approximately 60 minutes. The pH is maintained between 8.0 and 8.5 by adding a base, such as NaOH. The resulting urea-formaldehyde condensate solution is subsequently cooled to a temperature of 25°–35° C.

An aqueous solution containing free formaldehyde and low-molecularweight urea-formaldehyde addition products is preferably prepared in the manner described in U.S. Pat. No. 3,067,120 by absorption of gaseous formaldehyde in an aqueous urea solution supplied countercurrently to the formaldehyde gas stream, which absorption is carried out at a temperature of 30°–80° C., a pH of 7–9, and a U/F molar ratio of 1:4 to 1:10. A thus-prepared solution very suitable for the subject purpose is commercially available under the trade name "Formurea 80". "Formurea 80" is a clear low-viscous liquid, which is stable between −20° C. and +40° C., has a formaldehyde/urea molar ratio of approximately 5:1, and on analysis is found to contain per 100 parts by weight approximately 20 parts by weight of water, approximately 23 parts by weight of urea and approximately 57 parts by weight of formaldehyde, about 55% of the quantity of formaldehyde being bonded in low-molecular-weight methylol urea compounds, and the balance being present in non-bonded condition.

The catalysts to be used according to the present invention are, generally speaking, salts of strong inorganic or organic acids and weak, volatile or non-stable bases, which at normal temperature effect no or virtually no acid condensation, but at elevated temperature release so much strong acid that the acid condensation is effected in at most a few seconds. A important advantage of these catalysts is that the concentrated aqueous condensate solution and the catalyst readily admit of being homogeneously mixed, and the mixture can be sprayed in a homogeneous state. This promotes uniform acid condensation and the production of a uniform product.

The preferred catalyst is an addition salt of hydroxylamine and a strong acid, such as the sulfate, chloride, phosphate and the like, used in a proportion of 0.3–0.4%, calculated on the amount of dry matter in the condensate solution. The hydroxylamine salt can very suitably be used in the form of an aqueous solution of approximately 25%. Examples of other salts suitable to be used as catalysts are urea sulfate and urea phosphate.

The mixture of concentrated aqueous condensate solution and catalyst is sprayed over solid ureaform particles kept in spaced interrelationship and at such an elevated temperature that the catalyst is decomposed and the acid condensation is effected in the sprayed mixture. Practically simultaneously, or at any rate in very rapid succession, the acid condensation to form the ureaform is effected, the sprayed solid ureaform particles are coated with a layer of ureaform, and the coating is dried and neutralized. In this manner the ureaform particles can grow to round granules having any desired diameter between 1.5 and 4 mm.

During spraying, the ureaform particles are kept in spaced interrelationship in a fluidized bed or in a spherodizer.

Granulation in a fluidized bed is a generally known process, in which solid particles are maintained in the fluidized state by an upwardly directed stream of gas, while a coating solution or suspension is sprayed into or onto the fluidized bed. By suitable controlling the density and the temperature of the bed and the amount and temperature of sprayed material, it can be achieved in a well-known manner that the particles in the bed which are provided with a layer of coating material by spraying and dried practically immediately. The heat required for drying the material is generally supplied to the bed by pre-heating the stream of fluidization gas at a suitable temperature. Periodically or continuously, a portion of the contents are removed from the fluidized bed and sieved. The fraction having the desired particle size is cooled and stored. The undersized fraction can be recycled to the fluidized bed along with the ground, oversized fraction.

Granulation in a spherodizer is also a known process, which is described, for example, in U.S. Pat. No. 2,926,079. In it, the particles to be coated are processed in an inclined drum rotating about its longitudinal axis and having longitudinally spaced blades in the interior thereof. The particles are taken along by the blades in the upward direction and then released, whereafter they shower down. During this fall, when they are in spaced inter-relationship, they are sprayed with a coating solution or suspension. In this case, too, it can be achieved in known manner, by suitably controlling the various variables, that the particles provided with a layer of coating material are dried before they reach the bottom of the drum, where they contact other particles or granules. The heat required for the drying treatment can be supplied by blowing a hot inert gas, such as hot air, into the drum. When the granules have traversed the drum from the point of supply to the point of discharge, they leave the drum and are sieved. The fraction having the desired particle size is cooled and stored. The undersized fraction can be recycled to the drum together with the ground, oversized fraction.

In practice, excellent results are obtained by dissolving solid urea in "Formurea 80" to a U/F molar ratio of 1.3 – 2.0, adjusting the pH of the solution with dilute NaOH to 8.0–8.5, and reacting the solution for 50–70 minutes, for examle, 60 minutes, at a temperature of 50°–70° C., for example, at 60° C., while adjusting the pH with dilute NaOH to a value of between 8.0 and 8.5, cooling the resulting liquid condensate having a water content of 15–25% and a viscosity of 30–35 centipoises at 20° C. to 25°–35° C., and subsequently mixing it with 0.3–0.4% hydroxylamine sulfate, calculated on the dry matter in the liquid condensate, and atomizing the mixture in a quantity of 30–50 kg per hour, by means of two air sprayers, at a pressure of 1.5–3.0 atm gauge pressure (temperature of the spraying air 20°–50° C.) into a bed of 15–30 kg ureaform particles, maintained in the fluidized state by a stream of fluidization air of 500–1000 m³ per hour having a temperature of 150°–160° C. The temperature of the bed is then 100°–120° C. Under these circumstances the acid condensation is found to be effected in 0.5–2 seconds.

Surprisingly the ureaform granules thus produced do not contain any free acid (their ph being approximately 7), so that subsequent neutralization is not necessary.

The resulting ureaform has the following characteristics:

| Total nitrogen | ≧ 40% |
| Activity index (AOAC)* | 40–50% |
| Cold-water insoluble nitrogen, calculated on total nitrogen | > 65% |
| Free urea | < 10% |
| Moisture content | ≦ 0.5% |

*Activity index (AOAC)=

$$100 \times \frac{\text{\% cold-water-insoluble N} - \text{\% hot-water-insoluble N}}{\text{\% cold-water-insoluble N}}$$

We claim

1. A process for preparing ureaform granules, which comprises mixing a concentrated aqueous solution of a urea-formaldehyde condensate with a catalyst comprising a salt of a strong inorganic or organic acid and a weak, volatile or non-stable base, which salt at normal temperature effects no or virtually no acid condensation, but at elevated temperature releases so much strong acid as to effect the acid condensation in at most a few seconds, spraying the mixture of solution and catalyst over solid ureaform particles which are kept in spaced interrelationship and at such an elevated temperature that the catalyst is decomposed and acid condensation is effected, whereby the sprayed particles are coated with a layer of ureaform and dried.

2. A process according to claim 1, which comprises using an aqueous urea-formaldehyde condensate solution having a urea:formaldehyde molar ratio of between 1.3:1 and 2.0:1 and a water content of 15-25% by weight.

3. A process according to claim 2, which comprises using a clear concentrated aqueous urea-formaldehyde condensate solution prepared by adding urea as a solid or as an aqueous solution to an aqueous solution containing free formaldehyde and low-molecular weight urea-formaldehyde addition products, reacting the mixture at a constant pH of 8.0-8.5 and at a temperature of 50°-70° C. for 50-70 minutes, and cooling the resulting solution to a temperature of 25°-35° C.

4. A process according to claim 3, wherein said catalyst comprises an addition product of hydroxyl amine and a strong acid.

5. A process according to claim 4, wherein said catalyst comprises hydroxylamine sulfate, hydroxylamine chloride or hydroxylamine phosphate.

6. A process according to claim 4, wherein the catalyst is used in a proportion of 0.3-0.4% by weight, calculated on the dry matter in the condensate solution.

7. A process according to claim 1, which comprises maintaining the ureaform particles in spaced interrelationship in a fluidized bed during the spraying treatment.

8. A process according to claim 1, which comprises maintaining the ureaform particles in spaced interrelationship in a spherodizer during the spraying treatment.

* * * * *